(12) United States Patent
Wang et al.

(10) Patent No.: US 9,538,476 B2
(45) Date of Patent: Jan. 3, 2017

(54) METHOD AND SYSTEM FOR POWER ADJUSTMENT, BASE STATION, AND USER EQUIPMENT

(71) Applicant: Huawei Technologies Co., Ltd., Shenzhen (CN)

(72) Inventors: Fan Wang, Shenzhen (CN); Zhenfei Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 14/671,688

(22) Filed: Mar. 27, 2015

(65) Prior Publication Data
US 2015/0201382 A1    Jul. 16, 2015

Related U.S. Application Data

(63) Continuation of application No. PCT/CN2012/082388, filed on Sep. 28, 2012.

(51) Int. Cl.
*H04W 52/14*    (2009.01)
*H04W 72/04*    (2009.01)
(Continued)

(52) U.S. Cl.
CPC .......... *H04W 52/14* (2013.01); *H04W 52/146* (2013.01); *H04W 52/248* (2013.01); *H04W 52/58* (2013.01); *H04W 72/0406* (2013.01)

(58) Field of Classification Search
CPC .. H04W 52/146; H04W 52/248; H04W 52/14; H04W 72/0406; H04W 52/58
See application file for complete search history.

(56) References Cited

U.S. PATENT DOCUMENTS

2010/0202501 A1    8/2010  Yang et al.
2010/0254329 A1*  10/2010  Pan .................. H04L 5/001
                                                                370/329
(Continued)

FOREIGN PATENT DOCUMENTS

CN    101835255 A    9/2010
CN    102291812 A    12/2011
(Continued)

OTHER PUBLICATIONS

Samsung, "UE Specific Search Space Design for Cross-Cell Scheduling," 3GPP TSG RAN WG1 #62, Agenda Item 6.2.1.1, Madrid, Spain, Aug. 2010, R1-104570, 10 pages.
(Continued)

*Primary Examiner* — Khaled Kassim
*Assistant Examiner* — Syed S Ali
(74) *Attorney, Agent, or Firm* — Brinks Gilson & Lione (57) ABSTRACT

Provided in the present invention are a method and a system for power adjustment, a base station, and a user equipment. The method includes: receiving, by a UE, downlink control information that is sent by a base station and carries a transmit power control TPC command, determining, by the UE, a power control value corresponding to the power control command field according to the TPC command and a first condition, where the first condition is: information on a time when the UE receives the downlink control information, or information on a position of a physical downlink control channel PDCCH candidate, or information of a non-TPC command in the downlink control information, or a power control value preset in the UE, or indication information that is sent by the base station and indicates the power control value.

18 Claims, 4 Drawing Sheets

(51) Int. Cl.
*H04W 52/24* (2009.01)
*H04W 52/58* (2009.01)

(56) References Cited

U.S. PATENT DOCUMENTS

| | | | | |
|---|---|---|---|---|
| 2012/0044921 A1* | 2/2012 | Chung | ............... | H04J 11/0069 |
| | | | | 370/338 |
| 2012/0078933 A1* | 3/2012 | Kim | ............... | H04L 5/0007 |
| | | | | 707/758 |
| 2013/0012255 A1* | 1/2013 | Kim | ............... | H04W 52/42 |
| | | | | 455/522 |
| 2013/0064172 A1* | 3/2013 | Park | ............... | H04L 1/1861 |
| | | | | 370/315 |
| 2013/0170463 A1* | 7/2013 | Yang | ............... | H04L 1/1861 |
| | | | | 370/329 |
| 2013/0242923 A1* | 9/2013 | Yang | ............... | H04L 1/1825 |
| | | | | 370/329 |
| 2014/0146768 A1* | 5/2014 | Seo | ............... | H04L 5/001 |
| | | | | 370/329 |
| 2014/0328301 A1* | 11/2014 | Kim | ............... | H04L 5/0053 |
| | | | | 370/329 |
| 2014/0348078 A1* | 11/2014 | Kim | ............... | H04W 52/146 |
| | | | | 370/329 |
| 2015/0195069 A1* | 7/2015 | Yi | ............... | H04J 11/00 |
| | | | | 370/329 |
| 2015/0237611 A1* | 8/2015 | Ahn | ............... | H04W 72/0406 |
| | | | | 370/329 |
| 2015/0257150 A1* | 9/2015 | Yi | ............... | H04B 7/26 |
| | | | | 370/329 |

FOREIGN PATENT DOCUMENTS

| | | |
|---|---|---|
| CN | 102300304 A | 12/2011 |
| EP | 2 434 813 A1 | 3/2012 |
| WO | WO 2011/040858 A1 | 4/2011 |

OTHER PUBLICATIONS

"3$^{rd}$ Generation Partnership Project; Technical Specification Group Radio Access Network; Evolved Universal Terrestrial Radio Access (E-UTRA); Physical Layer Procedures (Release 11)," 3GPP TS 36.213, V11.0.0, Sep. 2012, 143 pages.

* cited by examiner

METHOD AND SYSTEM FOR POWER ADJUSTMENT, BASE STATION, AND USER EQUIPMENT

CROSS-REFERENCE TO RELATED APPLICATIONS

This application is a continuation of International Application No. PCT/CN2012/082388, filed on Sep. 28, 2012, which is hereby incorporated by reference in its entirety.

TECHNICAL FIELD

Embodiments of the present invention relate to communication technologies and, in particular, to a method and a system for power adjustment, a base station, and a user equipment.

BACKGROUND

In 3GPP long term evolution (LTE), an uplink power control algorithm of a physical uplink shared channel (PUSCH) uses a method of combining open loop power control and closed loop power control, where the power control is classified as the open loop power control and the closed loop power control according to whether the mobile station/terminal and the base station are involved simultaneously. Currently the closed loop power control is mostly used to compensate the error of the open loop power control, so as to archive precise control of channel fading under a frequency division duplex (FDD) mode.

For PUSCH transmission, taking control signaling overhead into account, a 2-bit transmit power control (TPC) command is used to indicate the closed loop power control which includes an accumulated mode and an absolute mode. Currently, in the accumulated mode, a TPC command supports a raise by 1 dB and 3 dB, that is the power may be increased by 1 dB or 3 dB on the basis of the power of last transmission; the TPC command supports a decline only by −1 dB, that is the power may be decreased by −1 dB on the basis of the power of last transmission. The advantage is that when channel conditions or other conditions change, the transmit power of a UE can be quickly increased so as to adapt to the channel conditions.

Because a physical downlink control channel (PDCCH) uses only 16-bit cyclic redundancy check (CRC), and the UE performs PDCCH blind detection up to 44 times in every transmission time interval (TTI, unit: ms), when the time is accumulated comparatively long, for example 1 s, the probability of false alarm or erroneous detection will increase greatly. Here the false alarm may be understood as a base station does not send a PDCCH, but the UE detects the PDCCH. Since in the accumulated mode, four code points have equivalent status, it can be assumed that the probability of false alarm for the TPC Command Field (TPC control command field: 0,1,2 or 3) is the same, noticing that the accumulated mode supports a raise by 1 dB and 3 dB, but supports a decline only by −1 dB, then in the statistics of certain time of accumulation, the power of UE is increased unnecessarily due to the false alarm or erroneous detection of the PDCCH, which will cause unnecessary power waste and uplink channel interference, and thus affects uplink performance.

SUMMARY

Accordingly, embodiments of the present invention provide a method and a system for power adjustment, a base station and a user equipment, so as to solve the problem in the prior art that the power of UE is unnecessarily accumulated excessively high or excessively low due to false alarms or erroneous detection of PDCCH.

In a first aspect, an embodiment of the present invention provides a method for power adjustment, including:

receiving, by a user equipment (UE), downlink control information that is sent by a base station and carries a transmit power control TPC command;

determining, by the UE, according to a power control command field in the TPC command and a first condition, a power control value corresponding to the power control command field;

where the first condition is:

information of a time when the UE receives the downlink control information; or information of a position of a physical downlink control channel (PDCCH) candidate; or information of a non-TPC command in the downlink control information; or a power control value preset in the UE; or indication information that is sent by the base station and used to indicate the power control value.

In a first possible implementation form according to the first aspect, the determining, by the UE, according to the power control command field in the TPC command and the first condition, the power control value corresponding to the power control command field, includes:

when the power control command field in the TPC command is 3, determining, by the UE, the power control value corresponding to the power control command field according to the first condition.

In a second possible implementation form according to the first possible implementation form, before the receiving, by the UE, downlink control information that is sent by the base station and carries the TPC command, the method further includes:

receiving, by the UE, a first message sent by the base station, where the first message is used to indicate that an accumulated mode is used for power control of a physical uplink shared channel (PUSCH) in the UE;

accordingly, when the power control command field in the TPC command is 3, the determining, by the UE, the power control value corresponding to the power control command field according to the first condition, specifically includes:

after the accumulated mode is used for the power control of the PUSCH in the UE, and when the power control command field in the TPC command is 3, determining, by the UE, the power control value corresponding to the power control command field according to the first condition.

In a third possible implementation form according to the first aspect and the above possible implementation forms, when the first condition is the information of the time when the UE receives the downlink control information, determining, by the UE, according to the first condition, the power control value corresponding to the power control command field, includes:

the information of the time of the downlink control information is sub-frame N, then determining, by the UE, the power control value corresponding to the power control command field to be 3 dB;

the information of the time of the downlink control information is sub-frame M, then determining, by the UE, the power control value corresponding to the power control command field to be −3 dB;

where, N is an odd number, M is an even number; or, N is an even number, M is an odd number.

In a fourth possible implementation form according to the first aspect or according to the first or the second possible implementation form, the first condition is the information of the position of the PDCCH candidate, determining, by the UE, according to the first condition, the power control value corresponding to the power control command field, includes:

if the information of the position of the PDCCH candidate is $L\{(Y_k+m') \bmod \lfloor N_{CCE,k}/L \rfloor\}+i$, and the parameter m' is N, then determining, by the UE, the power control value corresponding to the power control command field to be 3 dB;

if the information of the position of the PDCCH candidate is $L\{(Y_k+m') \bmod \lfloor N_{CCE,k}/L \rfloor\}+i$, and the parameter m' is M, then determining, by the UE, the power control value corresponding to the power control command field to be −3 dB;

where N is an odd number, M is an even number; or, N is an even number, M is an odd number;

where, $N_{CCE,k}$ is a number of control channel elements (CCEs) in a sub-frame whose reference number is K;

i=0, . . . , L−1, L is a number of CCEs contained in a PDCCH at a current aggregation level;

m'=m+$M^{(L)}$·$n_{CI}$, $n_{CI}$ is a carrier indicator, m=0, . . . , $M^{(L)}$−1, $Y_k$=(A·$Y_{k-1}$)modD, $Y_{-1}$=$n_{RNTI}$≠0, A=39827, D=65537; when $n_{CI}$ exists, the value of $n_{CI}$ is an arbitrary integer of 0 to 7; when $n_{CI}$ does not exist, m'=m;

the radio network temporary identifier (RNTI) is an identification of the UE.

In a fifth possible implementation form according to the first aspect, the first and the second possible implementation form, the first condition is the information of the non-TPC command in the downlink control information, the determining, by the UE, according to the first condition, the power control value corresponding to the power control command field, includes:

if one arbitrary bit in the information of the non-TPC command in the downlink control information is N, then determining, by the UE, the power control value corresponding to the power control command field to be 3 dB;

if one arbitrary bit in information of the non-TPC command in the downlink control information is M, then determining, by the UE, the power control value corresponding to the power control command field to be −3 dB;

where N is equal to 0, M is equal to 1; or, N is equal to 1, M is equal to 0.

In a sixth possible implementation form according to the fifth possible implementation form, the one arbitrary bit is used to indicate a localized virtual resource flag, a distributed virtual resource flag, or a frequency hopping flag.

In a seventh possible implementation form according to the first aspect or according to the first or the second possible implementation form, the preset power control value is 0 dB or reserved.

In an eighth possible implementation form according to the first aspect or according to the first or the second possible implementation form, the indication information, which is sent by the base station and is used to indicate the power control value, indicates that the power control value is 0 dB or reserved, then the UE determines that the power control value corresponding to the power control command field is 0 dB or reserved according to the indication information.

In a ninth possible implementation form according to the first aspect or any one of the above possible implementation forms, the method for power adjustment further comprises:

when the TPC command is a TPC command corresponding to a PUSCH, adjusting, by the UE, transmit power of the PUSCH according to the determined power control value; or, when the TPC command is a TPC command corresponding to a PUCCH, adjusting, by the UE, transmit power of the PUCCH according to the determined power control value.

In a second aspect, an embodiment of the present invention provides a method for power adjustment, including:

obtaining, by a base station, downlink control information that carries a transmit power control (TPC) command;

sending, by the base station, the downlink control information to a user equipment UE, to enable the UE to determine, according to a power control command field in the TPC command and a first condition, a power control value corresponding to the power control command field;

where the first condition is:

information of a time when the UE receives the downlink control information; or information of a position of a physical downlink control channel (PDCCH) candidate; or information of a non-TPC command in the downlink control information; or a power control value preset in the UE; or indication information that is sent by the base station and indicates the power control value.

In a first possible implementation form according to the second aspect, the determining, by the UE, according to a power control command field in the TPC command and a first condition, a power control value corresponding to the power control command field, includes:

when the power control command field in the TPC command is 3, determining, by the UE, the power control value corresponding to the power control command field according to the first condition.

In a second possible implementation form according to the first possible implementation form, before the sending, by the base station, the downlink control information that carries the TPC command to the UE, the method further includes:

sending, by the base station, a first message to the UE, where the first message is used to indicate that an accumulated mode is used for power control of a physical uplink shared channel (PUSCH) in the UE, to enable the UE to use, according to the first message, the accumulated mode for the power control of the PUSCH in the UE, and to determine, when the power control command field in the TPC command is 3 and according to the first condition, the power control value corresponding to the power control command field.

In a third aspect, an embodiment of the present invention further provides a user equipment, including:

a receiving unit, configured to receive downlink control information that is sent by a base station and carries a transmit power control TPC command;

a determining unit, configured to determine, according to a power control command field in the TPC command and a first condition, a power control value corresponding to the power control command field;

where the first condition is:

information of a time when the UE receives the downlink control information; or information of a position of a physical downlink control channel (PDCCH) candidate; or information of a non-TPC command in the downlink control information; or a power control value preset in the user equipment; or indication information that is sent by the base station and received by the receiving unit, and indicates the power control value.

In a first possible implementation form according to the third aspect, the determining unit is specifically configured to, when the power control command field in the TPC command of the downlink control information received by the receiving unit is 3, determine, according to the first condition, the power control value corresponding to the power control command field.

In a second possible implementation form according to the first possible implementation form, the receiving unit is further configured to receive a first message sent by the base station, where the first message is used to indicate that an accumulated mode is used for power control of a physical uplink shared channel (PUSCH) in the UE;

correspondingly, the determining unit is specifically configured to use the accumulated mode for the power control of the PUSCH in the UE, and, when the power control command field in the TPC command of downlink control information received by the receiving unit is 3, to determine, according to the first condition, the power control value corresponding to the power control command field.

In a third possible implementation form according to the third aspect and the above possible implementation forms, the user equipment further includes:

an adjusting unit, configured to adjust, when the TPC command is a TPC command corresponding to a PUSCH, transmit power of a PUSCH according to the determined power control value;

or, to adjust, when the TPC command is a TPC command corresponding to a PUCCH, transmit power of a PUCCH according to the determined power control value.

In a fourth aspect, an embodiment of the present invention further provides a base station, including:

an obtaining unit, configured to obtain downlink control information that carries a transmit power control (TPC) command;

a sending unit, configured to send the downlink control information to a user equipment UE, to enable the UE to determine, according to a power control command field in the TPC command and a first condition, a power control value corresponding to the power control command field;

where the first condition is:

information of a time when the sending unit sends the downlink control information; or information of a position of a physical downlink control channel (PDCCH) candidate carried in the downlink control information; or information of a non-TPC command in the downlink control information; or a power control value preset in the UE; or indication information that is sent by sending unit and indicates the power control value.

In a possible implementation form according to the fourth aspect, the sending unit is further configured to:

send a first message to the UE, where the first message is used to indicate that an accumulated mode is used for power control of a physical uplink shared channel (PUSCH) in the UE, to enable the UE to use, according to the first message, the accumulated mode for the PUSCH power control in the UE and, when the power control command field in the TPC command is 3, to determine, by the UE, the power control value corresponding to the power control command field according to the first condition.

In a fifth aspect, an embodiment of the present invention further provides a communication system, including any one of the aforementioned user equipments, and any one of the aforementioned base stations, where the user equipment communicates with the base station.

As can be known from the above technical solutions, the method and the system for power adjustment, the base station, and the user equipment in the embodiments of the present invention, enable the UE to determine the power control value corresponding to the power control command field according to the power control command field in the TPC command and the first condition, and then the UE can avoid the problem that in a certain statistical time the power of UE is unnecessarily accumulated excessively high or excessively low due to false alarms or erroneous detection of the PDCCH.

BRIEF DESCRIPTION OF DRAWINGS

To describe technical solutions in embodiments of the present invention more clearly, the following briefly introduces accompanying drawings needed for describing the embodiments. Apparently, the accompanying drawings illustrate merely drawings of some embodiments of the present invention, and persons of ordinary skill in the art may still derive other drawings, which also can implement the technical solution of the present invention, from these accompanying drawings without creative effort.

DESCRIPTION OF EMBODIMENTS

To make the objectives, technical solutions, and advantages of the present invention clearer, the following clearly and comprehensively describes the technical solutions of the present invention with reference to the accompanying drawings in the embodiments of the present invention. Apparently, the described embodiments are merely a part of embodiments of the present invention. Persons of ordinary skill in the art can obtain other embodiments, which can solve the technical problem of the present invention and achieve the technical effects of the present invention, based on embodiments of the present invention described in the following, through equivalent substitution of part or even all technical features, without creative effort. All these embodiment obtained by substitution shall fall within the protection scope of the present invention.

Embodiments of the present invention are applicable to long term evolution (LTE).

For PUSCH transmission, taking control signaling overhead into account, a 2-bit TPC command is used to indicate closed-loop power control which includes an accumulated mode and an absolute mode. For the accumulated mode, power control values corresponding to 4 code points formed by the 2 bits are [4,0,1,3] dB. While for the absolute mode, the power control values corresponding to the 4 code points are [−4,−1,1,4] dB.

Currently, downlink control information (DCI) format 0/3/4 is used as a scheduling grant for an uplink PUSCH, it includes at least a TPC command. A mapping relationship between the TPC command and power adjustment is shown as in Table 1.

TABLE 1

Mapping relationship between the TPC command corresponding to the PUSCH and power adjustment

| TPC Command Field in DCI format 0/3/4 (TPC Command Field in DCI format 0/3/4) | Accumulated $\delta_{PUSCH,c}$ [dB] (Accumulated mode) | Absolute $\delta_{PUSCH,c}$ [dB] only DCI format 0/4 (Absolute mode) |
|---|---|---|
| 0 | −1 | −4 |
| 1 | 0 | −1 |
| 2 | 1 | 1 |
| 3 | 3 | 4 |

As can be seen from the Table 1, the TPC command carried in the DCI supports a raise by 1 dB and 3 dB, that is, the power may be increased by 1 dB or 3 dB on the basis of the power of last transmission; and supports a decline by −1 dB, that is the power may be decreased by −1 dB on the basis of the power of last transmission. The PUSCH transmission solution in the accumulated mode enables the transmit power of a UE to be quickly increased so as to adapt to the channel conditions.

The power control command corresponding to the uplink PUSCH is carried in PDCCH DCI format 0/3/4, according to provisions in 3GPP TS36.213, the UE performs blind detection to PDCCH DCI formant 0/3/4, which is divided into a UE-specific search space and a common search space, and there are 4 aggregation levels, as shown in Table 2.

TABLE 2

PDCCH Candidate monitored by a UE

| (Search space) Search space $S_k^{(L)}$ | | | Number of PDCCH candidates |
|---|---|---|---|
| Type (Type) | Aggregation level L (Aggregation level) | Size [in CCEs] | $M^{(L)}$ (Position of PDCCH candidates) |
| UE-specific (UE-specific search space) | 1 | 6 | 6 |
| | 2 | 12 | 6 |
| | 4 | 8 | 2 |
| | 8 | 16 | 2 |
| Common (common search space) | 4 | 16 | 4 |
| | 8 | 16 | 2 |

The UE performs blind detection up to 44 times, the search set contains 4 aggregation levels, and after control channel elements (CCE) have been numbered logically, for each aggregation level, the detecting position meets $S_k^{(L)}$;

where $S_k^{(L)} = L\{(Y_k + m') \mod \lfloor N_{CCE,k}/L \rfloor\} + i$;

in which $N_{CCE,k}$ is the number of control channel elements (CCEs) in the sub-frame whose reference number is K;

i=0, . . . , L−1, L is the number of control channel elements (CCEs) contained in the PDCCH at the current aggregation level;

m'=m+$M^{(L)} \cdot n_{CI}$, $n_{CI}$ is a carrier indicator, m=0, . . . , $M^{(L)}$−1, $Y_k = (A \cdot Y_{k-1}) \mod D$, $Y_{-1} = n_{RNTI} \neq 0$, A=39827, D=65537; when $n_{CI}$ exists, the value of $n_{CI}$ is an arbitrary integer of 0 to 7; when $n_{CI}$ does not exist, m'=m;

the cell radio network temporary identifier (RNTI) is an identification of the UE.

Because PDCCH uses only 16-bit CRC, and the UE performs blind detection for PDCCH up to 44 times in every TTI (ms), therefore when the time is accumulated comparatively long, for example 1 s, the probability of false alarm or erroneous detection will increase greatly. Here the false alarm may be understood as a base station does not send a PDCCH, but the UE detects the PDCCH. Since the four code points have equivalent status, it can be assumed that the probability of false alarm for a TPC Command Field (that is, 0, 1, 2, 3) is the same, noticing that the accumulated mode supports a raise by 1 dB and 3 dB, and supports a decline only by −1 dB, then after a long time of accumulation, the power of UE is increased unnecessarily due to false alarms or erroneous detection of the PDCCH, and from an whole look of this time of accumulation, this will cause unnecessary power waste and uplink channel interference, and thus affect uplink performance. For example, for the UE, the probability of receiving a TPC command in which the power control command field is 0, 1, 2, or 3, is the same in the time of accumulation. From the entire time of accumulation, the effects of the TPC command being 0 (corresponding to the accumulated mode being −1 dB) and TPC command being 2 (corresponding to the accumulated mode being 1 dB) are offset by each other, while the effect of the TPC command being 3 (corresponding to the accumulated mode being 3 dB), seen from the entire time of accumulation, cannot be offset. Therefore when false alarm or erroneous detection occurs, the power of the UE will be increased continuously, resulting in unnecessary waste.

Besides, for the power control of PUCCH, LTE supports the accumulated mode, the mapping relationship between the TPC command corresponding to the PUCCH and the power adjustment is shown as in Table 3. Also, due to false alarms or erroneous detection of PDCCH, the power of PUCCH may be increased unnecessarily, and when increased to a certain extent, this will result in unnecessary power waste and uplink channel interference and thus affect uplink performance.

TABLE 3

Mapping relationship between the TPC command corresponding to the PUCCH and power adjustment

| TPC Command Field in DCI format 1A/1B/1D/1/2A/2B/2C/2/3 | $\delta_{PUSCH}$ [dB] |
|---|---|
| 0 | −1 |
| 1 | 0 |
| 2 | 1 |
| 3 | 3 |

Accordingly, embodiments of the present invention provide a method for power adjustment, so that the false alarm or erroneous detection of PDCCH will not cause the PUSCH transmit power of the UE to be unnecessarily accumulated excessively high or excessively low. For example, when the false alarm or erroneous detection occurs, the positive number (3 dB) and the negative number (−3 dB) mapped by the power control command in the TPC command may be made completely symmetrical, so, seen in the entire time of accumulation, the increased power and the decreased power of the UE are offset, so that the false alarm or erroneous detection of PDCCH will not cause the PUSCH transmit power of the UE to be unnecessarily accumulated excessively high or excessively low.

Figure 1:
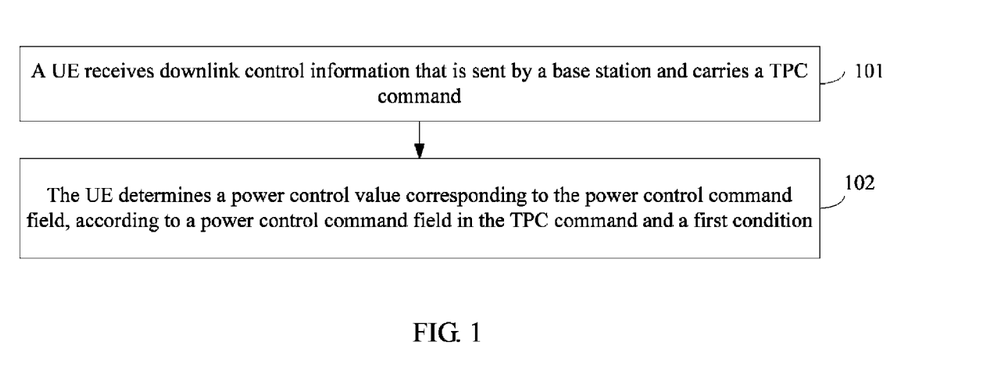
FIG. 1 is a schematic flowchart of a method for power adjustment provided by an embodiment of the present invention.

FIG. 1 is a schematic flowchart of a method for power adjustment provided by an embodiment of the present invention, as shown in FIG. 1, the method for power adjustment according to this embodiment is described as follows:

Step 101: A UE receives downlink control information that is sent by a base station and carries a TPC command.

Step 102: The UE determines a power control value corresponding to the power control command field, according to a power control command field in the TPC command and a first condition.

Optionally, when the power control command field in the TPC command is 3 (i.e., TPC Command Field=3), the UE determines the power control value corresponding to 'TPC Command Field=3' according to the first condition.

For example, the first condition in this embodiment may be any one of the following conditions:
information of the time when the UE receives the DCI; or
information of the position of the PDCCH candidate (information of the position of the PDCCH Candidate); or
information of a non-TPC command in the DCI; or
a power control value preset in the UE; or
indication information that is sent by the base station and indicates the power control value.

For example, in one possible implementation form, if the first condition is information of a time when the UE receives the DCI, the step 102 may include:
when the TPC Command Field=3 in the DCI, if the information of the time of the DCI is sub-frame N, then the UE determines that the power control value corresponding to the 'TPC Command Field=3' is 3 dB;
if the information of the time of the DCI is sub-frame M, then the UE determines that the power control value corresponding to the 'TPC Command Field=3' is −3 dB;
where, N is an odd number, M is an even number; or, N is an even number, M is an odd number.

In a second possible implementation form, if the first condition is information of a position of a PDCCH candidate in the DCI received by the UE, the step 102 may include:
when the TPC Command Field=3 in the DCI, if the information of the position of the PDCCH candidate is $L\{(Y_k+m')\mod\lfloor N_{CCE,k}/L\rfloor\}+i$, and the parameter m' is N, then the UE determines that the power control value corresponding to the 'TPC Command Field=3' is 3 dB;
if the information of the position of the PDCCH candidate is $L\{(Y_k+m')\mod\lfloor N_{CCE,k}/L\rfloor\}+i$, and the parameter m' is M, then the UE determines that the power control value corresponding to the 'TPC Command Field=3' is −3 dB;
where, N is an odd number, M is an even number; or, N is an even number, M is an odd number;
in which, $N_{CCE,k}$ is the number of control channel elements (CCEs) in the sub-frame whose reference number is K;
i=0, . . . , L−1, L is the number of CCEs contained in a PDCCH at a current aggregation level;
$m'=m+M^{(L)}\cdot n_{CI}$, $n_{CI}$ is a carrier indicator, m=0, . . . , $M^{(L)}-1$, $Y_k=(A\cdot Y_{k-1})\mod D$, $Y_{-1}=n_{RNTI}\neq 0$, A=39827, D=65537; when $n_{CI}$ exists, the value of $n_{CI}$ is an arbitrary integer of 0 to 7; when $n_{CI}$ does not exist, m'=m;

a cell radio network temporary identifier (RNTI) is an identification of the UE.

In a third possible implementation form, if the first condition is information of a non-TPC command in the DCI, the step 102 may include:
when the TPC Command Field=3 in the DCI, if one arbitrary bit in the information of the non-TPC command in the DCI is N, then the UE determines that the power control value corresponding to the 'TPC Command Field=3' is 3 dB;
if one arbitrary bit in the information of the non-TPC command in the DCI is M, then the UE determines that the power control value corresponding to the 'TPC Command Field=3' is −3 dB;
where, N equals 0, M equals 1; or, N equals 1, M equals 0.

Especially, N and M may be any code point, here N may be all 1 s, M may be all 0 s; or, N may be all 0 s, M may be all 1 s.

For example, the one arbitrary bit may include: localized virtual resource flag (Localized VRB assignment flag), distributed virtual resource flag (Distributed VRB assignment flag), or frequency hopping flag (Frequency hopping flag) and so on, this embodiment is merely for illustration, not for limitation.

In a forth possible implementation form, if the first condition is a power control value preset in the UE, the step 102 may include:
when the TPC Command Field=3 in the DCI, the UE determines that the power control value corresponding to the 'TPC Command Field=3' is 0 dB or reserved (reserved). It should be appreciated that both the network side and the UE know the meaning of "reserved". The "reserved" may be understood as that there is no meaning for the TPC power control command field.

In a fifth possible implementation form, if the first condition is indication information that is sent by the base station and received by the UE and indicates the power control value, where the indication information here may be sent by the base station and be used to indicate that the power control value is 0 dB or reserved, in this circumstance, the step 102 may specifically be:
when the TPC Command Field=3 in the DCI, the UE determines, according to the indication information, that the power control value corresponding to the 'TPC Command Field=3' is 0 dB or reserved.

Of course, in practical applications, if, in the step 101, the TPC command in the downlink control information is a TPC command corresponding to a PUSCH (i.e., DCI format 0/3/4), the UE adjusts transmit power of the PUSCH according to the determined power control value;
or,
if the TPC command is a TPC command corresponding to a PUCCH (i.e., DCI format 1A/1B/1D/1/2A/2B/2C/2/3), the UE adjusts transmit power of the PUCCH according to the determined power control value.

It should be noted that, the downlink control information sent by a base station (eNB/NB) to a user equipment (UE) may be downlink control information used for carrying uplink scheduling information, such as: DCI 0/4, etc., may also be downlink control information used for carrying transmit power control command, such as: DCI 3/3A, etc.

In a communication network, the physical downlink control channel (PDCCH) is used for carrying downlink control information (DCI) sent by the eNB to the UE. The PDCCH is a shared channel and can be monitored by all the UE. Thereby a distinguishing mechanism is needed, so that a UE can know which DCI is sent to this UE. Downlink control information (DCI) is carried on the PDCCH channel, and has multiple formats, for example, DCI 0 is used to carry uplink scheduling information; DCI 1/1A/1B/1C/1D/2/2A is used to carry downlink scheduling information; DCI 3/3A is dedicatedly used to carry a transmit power control (TPC) command and can carry a common command for multiple UEs at a time.

It can be seen from the above embodiments, in the method for power adjustment according to the embodiment, when in the downlink control information sent by the base station the TPC Command Field=3, the UE is enabled to determine the power control value corresponding to the 'TPC Command Field=3' according to the first condition, in a certain time of accumulation, the increased power and the decreased power of the UE are offset by each other, so that the problem in the prior art that the power of UE is unnecessarily accumulated excessively high or excessively low due to false alarms or erroneous detection of the PDCCH can be solved, thereby the power waste can be reduced, and the interference to the uplink channel of other UE can be reduced.

Figure 2A:
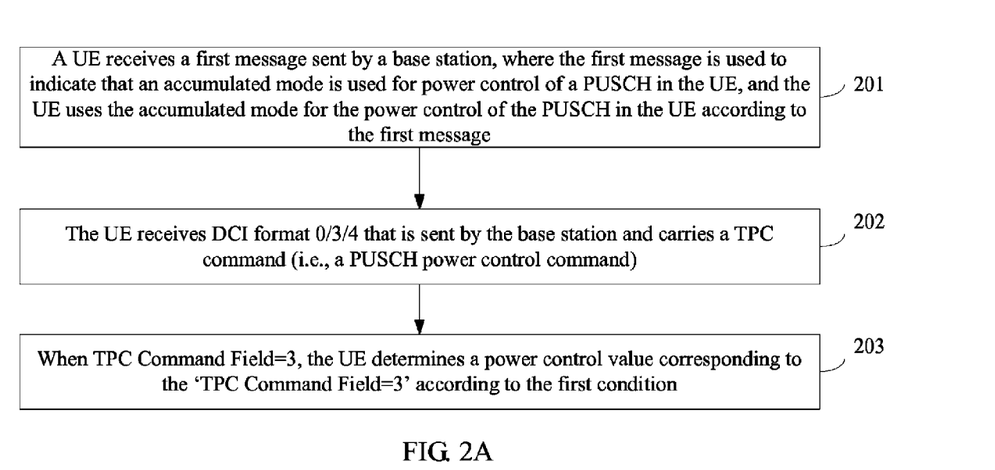
FIG. 2A and FIG. 2B are schematic flowcharts of a method for power adjustment pro vided by another embodiment of the present invention.

FIG. 2A shows a schematic flowchart of a method for power adjustment provided by an embodiment of the present invention, as shown in FIG. 2A, the method for power adjustment according to this embodiment is as follows.

This embodiment takes the power control for a PUSCH as an example for illustration.

Step 201: A UE receives a first message sent by a base station, where the first message is used to indicate that an accumulated mode is used for power control of a PUSCH in the UE, and the UE uses the accumulated mode for the power control of the PUSCH in the UE according to the first message.

Step 202: The UE receives DCI format 0/3/4 that is sent by the base station and carries a TPC command (i.e., a PUSCH power control command).

Step 203: When TPC Command Field=3, the UE determines a power control value corresponding to the 'TPC Command Field=3' according to the first condition.

That is to say, after the accumulated mode is used for the power control of the PUSCH in the UE, and when the power control command field in the TPC command is 3, the UE determines the power control value corresponding to the power control command field according to the first condition.

In an application scenario, if the first condition is the information of the time of DCI format 0/3/4, then the step 203 may specifically be:

when TPC Command Field=3, the UE determines the power control value corresponding to the 'TPC Command Field=3' based on the information of the time of DCI format 0/3/4. For example, the information of the time of the DCI format 0/3/4 is sub-frame N, then when N is an odd number, the UE determines that the power control value may be −3 dB;

when N is an even number, the UE determines that the power control value may be 3 dB. In this way, it can be guaranteed that the positive number (3 dB) and the negative number (−3 dB) mapped to the power control command in the TPC command are completely symmetrical, so it can be avoided that the PUSCH transmit power of the UE is accumulated excessively high or excessively low unnecessarily due to the false alarm or erroneous detection of PDCCH.

Of course, when the N is an even number, the power control value determined by the UE may be 3 dB; when N is an odd number, the power control value determined by the UE may be −3 dB. This present embodiment is merely for illustration, not for limitation.

In a second application scenario, if the first condition is information of a position of a PDCCH Candidate defined in the 3GPP TS36.213 protocol, that is, DCI format 0/3/4 containing a power control command for PUSCH is received at a position starting from $L\{(Y_k+m')\bmod\lfloor N_{CCE,k}/L\rfloor\}$, then the step 203 may be exemplified as follows:

when TPC Command Field=3, the UE determines the power control value corresponding to the 'TPC Command Field=3' based on the information of the position of PDCCH Candidate defined in the 3GPP TS36.213 protocol, for example, the parameter m' is an odd number, the UE may determine the power control value to be −3 dB; the parameter m' is an even number, the UE may determine the power control value to be 3 dB; or, the parameter m' is an odd number, the UE may determine the power control value to be 3 dB; the parameter m' is an even number, the UE may determine the power control value to be −3 dB;

for the parameters in the formula, reference may be made to the meanings in other embodiments, which will not be repeated in detail herein.

In a third application scenario, if the first condition is information of a non-TPC command, the power control value is determined as follows: if the UE receives DCI format 0, when Frequency hopping flag=1, the UE may determine the power control value to be −3 dB; when Frequency hopping flag=0, the UE may determine the power control value to be 3 dB;

or, when Frequency hopping flag=0, the UE may determine the power control value to be −3 dB; when Frequency hopping flag=1, the UE may determine the power control value to be 3 dB.

In a fourth application scenario, if the first condition is a power control value preset at the UE side, then the step 203 may be exemplified as follows:

when the TPC Command Field=3, the UE determines that the power control value is 0 dB or reserved.

In a fifth application scenario, if the first condition is indication information that is sent by the base station and indicates the power control value, then the step 203 may be exemplified as follows:

the indication information that is sent by the base station and used to indicate the power control value may indicate to the UE that, when the TPC Command Field=3, the power control value is 0 dB or reserved, then after receiving the indication information, the UE determines that the power control value is 0 dB or reserved, otherwise, the power control value is set in accordance with the specification of LTE Rel-11, i.e., 3 dB.

It should be noted that, the indication information in this step may be carried in the first message in step 201, or a second message carrying the indication information may also be sent separately, which is not limited in this embodiment.

Figure 2B:
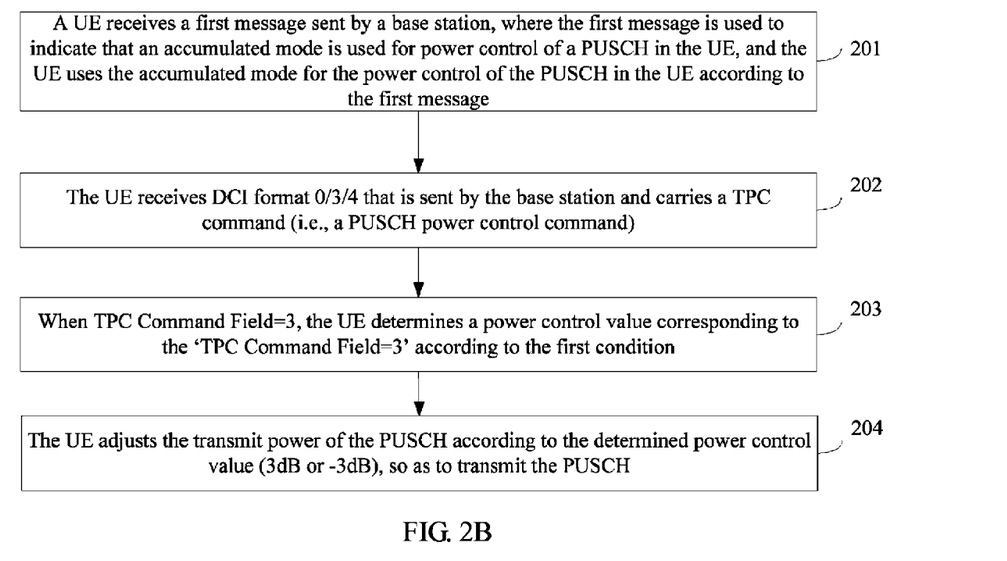

Optionally, as shown in FIG. 2B, the above method for power adjustment may further include a step 204 as following.

Step 204: The UE adjusts the transmit power of the PUSCH according to the determined power control value (3 dB or −3 dB), so as to transmit the PUSCH.

In the method for power adjustment according to this embodiment, for the power control of the PUSCH, by the completely symmetrical distribution of the positive number and the negative number of the power control value, in a certain time of accumulation, the increased power and the decreased power of the UE are offset by each other, so that the problem in the prior art that the power of UE is unnecessarily accumulated excessively high or excessively low due to false alarms or erroneous detection of the PDCCH can be solved, thereby the power waste can be reduced, and the interference to the uplink channel of other UE can be reduced.

Figure 3A:
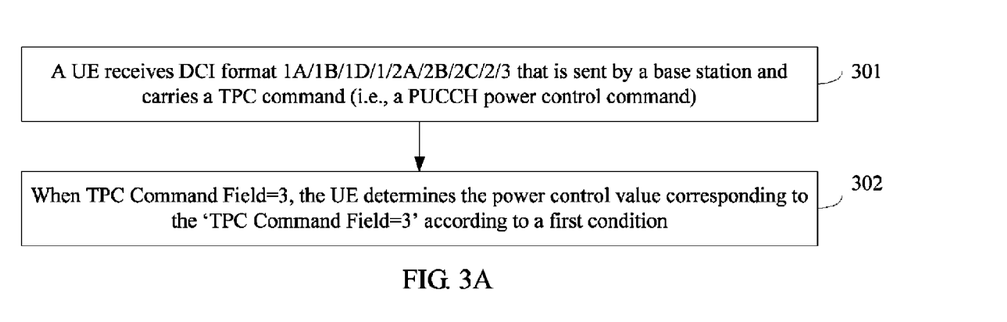
FIG. 3A and FIG. 3B are schematic flowcharts of a method for power adjustment provided by another embodiment of the present invention.

FIG. 3A shows a schematic flowchart of a method for power adjustment provided by an embodiment of the present invention, as shown in FIG. 3A, the method for power adjustment according to this embodiment is as follows.

This embodiment takes the power control for a PUCCH as an example for illustration.

Step 301: A UE receives DCI format 1A/1B/1D/1/2A/2B/2C/2/3 that is sent by a base station and carries a TPC command (i.e., a PUCCH power control command).

Step 302: When TPC Command Field=3, the UE determines the power control value corresponding to the 'TPC Command Field=3' according to a first condition.

In an application scenario, if the first condition is information of a time of the DCI format 1A/1B/1D/1/2A/2B/2C/2/3, then the step 302 may be exemplified as follows:

when TPC Command Field=3, the UE determines the power control value corresponding to the 'TPC Command Field=3' based on the information of the time of the DCI format 1A/1B/1D/1/2A/2B/2C/2/3. For example, the information of the time of the DCI format 1A/1B/1D/1/2A/2B/2C/2/3 is sub-frame N, then when N is an odd number, the UE determines that the power control value may be −3 dB; when N is an even number, the UE determines that the power control value may be 3 dB. In this way, it can be guaranteed that the positive number (3 dB) and the negative number (−3 dB) mapped to the power control command in the TPC command are completely symmetrical, so it can be avoided that the PUCCH transmit power of the UE is accumulated excessively high or excessively low unnecessarily due to the false alarm or erroneous detection of PDCCH.

Of course, when the N is an even number, the power control value may be determined as 3 dB; when N is an odd number, the power control value determined by the UE determines may be −3 dB. This present embodiment is merely for illustration, not for limitation.

In a second application scenario, if the first condition is based on information of a position of a PDCCH Candidate defined in the 3GPP TS36.213 protocol, that is, the DCI format 1A/1B/1D/1/2A/2B/2C/2/3 containing the power control command for the PUSCH is received at a position starting from $L\{(Y_k+m')\mod[N_{CCE,k}/L]\}$, then the step 302 may be exemplified as follows:

when TPC Command Field=3, the UE determines the power control value corresponding to the 'TPC Command Field=3' based on the position information of the PDCCH Candidate defined in the 3GPP TS36.213 protocol, for example, the parameter m' is an odd number, the UE may determine the power control value to be −3 dB; the parameter m' is an even number, the UE may determine the power control value to be 3 dB; or, the parameter m' is an odd number, the UE may determine the power control value to be 3 dB; the parameter m' is an even number, the UE may determine the power control value to be −3 dB.

For the parameters in the formula, reference may be made to the meanings in other embodiments, which will not be repeated in detail herein In a third application scenario, if the first condition is information of a non-TPC command, the power control value is determined as follows: if the UE receives DCI format 1A, when Localized/Distributed VRB assignment flag=1, the UE may determine the power control value to be −3 dB; when Localized/Distributed VRB assignment flag=0, the UE may determine the power control value to be 3 dB;

or, when Localized/Distributed VRB assignment flag=0, the UE may determine the power control value to be −3 dB; when Localized/Distributed VRB assignment flag=1, the UE may determine the power control value to be 3 dB.

In a fourth application scenario, if the first condition is a power control value preset at the UE side, then the step 302 may be exemplified as follows:

when the TPC Command Field=3, the UE determines that the power control value is 0 dB or reserved.

In a fifth application scenario, if the first condition is indication information that is sent by the base station and indicates the power control value, then the step 302 may be exemplified as follows:

the indication information that is sent by the base station and indicates the power control value may indicates, to the UE, that when the TPC Command Field=3, the power control value is 0 dB or reserved, then after receiving the indication information, the UE determines that the power control value is 0 dB or reserved, otherwise, the power control value is set in accordance with the specification of LTE Rel-11, i.e., 3 dB.

It should be noted that, the indication information in this step may be a second message that is sent separately and carries the indication information, which is not limited in this embodiment.

Figure 3B:
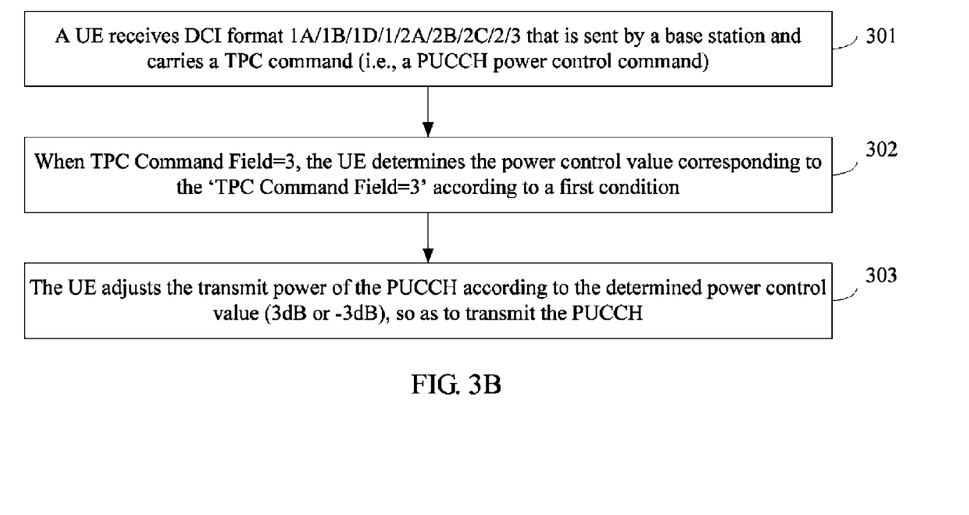

Optionally, as shown in FIG. 3B, the above method for power adjustment may further include a step 303 as following.

Step 303: The UE adjusts the transmit power of the PUCCH according to the determined power control value (3 dB or −3 dB), so as to transmit the PUCCH.

In the method for power adjustment according to this embodiment, for the power control of the PUCCH, in a certain time of accumulation, the increased power value and the decreased power value of the UE are offset by each other, so that the problem in the prior art that the power of UE is unnecessarily accumulated excessively high or excessively low due to false alarms or erroneous detection of the PDCCH can be solved, thereby the power waste can be reduced, and the interference to the uplink channel of other UE can be reduced.

Figure 4:
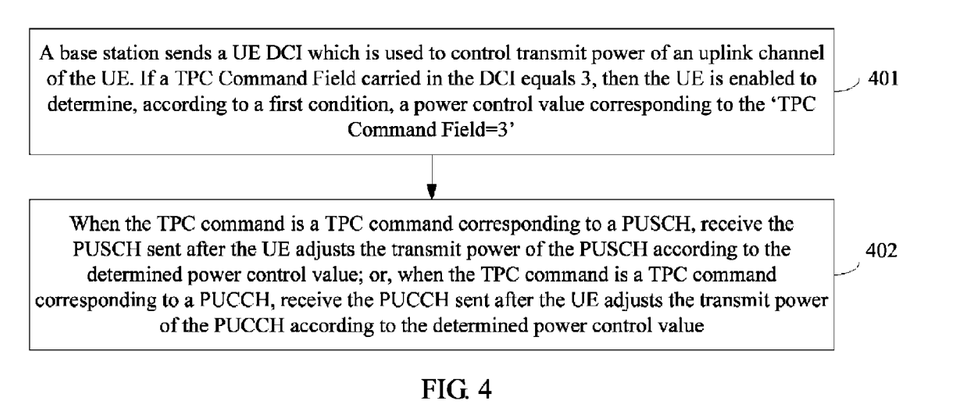
FIG. 4 is a schematic flowchart of a method for power adjustment provided by another embodiment of the present invention.

FIG. 4 shows a schematic flowchart of a method for power adjustment provided by an embodiment of the present invention. As shown in FIG. 4, the method for power adjustment according to this embodiment is as follows.

The power control in this embodiment is applicable for both PUCCH and PUSCH.

Step 401: A base station sends a UE DCI which is used to control transmit power of an uplink channel of the UE. If a TPC Command Field carried in the DCI equals 3, then the UE is enabled to determine, according to a first condition, a power control value corresponding to the 'TPC Command Field=3'.

Where the first condition may be one of the following conditions:

information of a time when the UE receives the DCI or information of a time when the base station sends the DCI; or information of a position of a PDCCH candidate; or
information of a non-TPC command in the DCI; or
a power control value preset in the UE; or
indication information that is sent by the base station and indicates the power control value.

Step 402: When the TPC command is a TPC command corresponding to a PUSCH, receive the PUSCH sent after the UE adjusts the transmit power of the PUSCH according to the determined power control value;

or, when the TPC command is a TPC command corresponding to a PUCCH, receive the PUCCH sent after the UE adjusts the transmit power of the PUCCH according to the determined power control value.

It should be noted that, if the power control is the adjustment of the PUSCH power, the above method further includes the following step 401a which is not shown in the drawing, the step 401a is prior to the step 401.

step 401a: The base station sends a first message to the UE, where the first message is used to indicate that an accumulated mode is used for the power control of the PUSCH in the UE, so as to enable the UE to determine, according to the first condition, the power control value corresponding to the power control command field, after the UE uses, according to the first message, the accumulated mode for the power control of the PUSCH in the UE.

The following describes with examples how to enable the UE to determine, according to the first condition, the power control value corresponding to the power control command field, as the first condition differs.

In one optional implementation scenario, if the first condition is information of a time when the base station sends the DCI, the enabling the UE to determine, according to the first condition, the power control value corresponding to the 'TPC Command Field=3' in the step 401 may include:

the information of the time when the base station sends the DCI is sub-frame N, then enabling the UE to determine that the power control value corresponding to the 'TPC Command Field=3' is 3 dB;

the information of the time when the base station sends the DCI is sub-frame M, then enabling the UE to determine that the power control value corresponding to the 'TPC Command Field=3' is −3 dB;

where, N is an odd number, M is an even number; or, N is an even number, M is an odd number.

In a second optional implementation scenario, if the first condition is information of a position of a PDCCH candidate carried in the DCI sent by the base station, the enabling the UE to determine, according to the first condition, the power control value corresponding to the 'TPC Command Field=3' in the step 401 may include:

if the information of the position of the PDCCH candidate carried in the DCI sent by the base station is $L\{(Y_k+m') \bmod \lfloor N_{CCE,k}/L \rfloor\}+i$, and the parameter m' is N, then enabling the UE to determine that the power control value corresponding to the 'TPC Command Field=3' is 3 dB;

if the information of the position of the PDCCH candidate carried in the DCI sent by the base station is $L\{(Y_k+m') \bmod \lfloor N_{CCE,k}/L \rfloor\}+i$, and the parameter m' is M, then enabling the UE to determine that the power control value corresponding to the power control command field is −3 dB;

where, N is an odd number, M is an even number; or, N is an even number, M is an odd number;

in which, $N_{CCE,k}$ is the number of control channel elements CCEs in the sub-frame whose reference number is K;

i=0, . . . , L−1, L is the number of CCEs contained in the PDCCH at a current aggregation level;

$m'=m+M^{(L)} \cdot n_{CI}$, $n_{CI}$ is a carrier indicator, m=0, . . . , $M^{(L)}$−1, $Y_k=(A \cdot Y_{k-1}) \bmod D$, $Y_{-1}=n_{RNTI} \neq 0$, A=39827, D=65537; when $n_{CI}$ exists, the value of $n_{CI}$ is an arbitrary integer of 0 to 7; when $n_{CI}$ does not exist, m'=m;

the radio network temporary identifier (RNTI) is an identification of the UE.

In a third optional implementation scenario, if the first condition is information of a non-TPC command in the DCI sent by the base station, the enabling the UE to determine, according to the first condition, the power control value corresponding to the 'TPC Command Field=3' in the step 401 may include:

if one arbitrary bit in the information of the non-TPC command in the DCI is N, then enabling the UE to determine that the power control value corresponding to the 'TPC Command Field=3' is 3 dB;

if one arbitrary bit in the information of the non-TPC command in the DCI is M, then enabling the UE to determine that the power control value corresponding to the 'TPC Command Field=3' is −3 dB;

where, N equals 0, M equals 1; or, N equals 1, M equals 0;

optionally, if any code point in the information of the non-TPC command in the DCI is M, then enabling the UE to determine that the power control value corresponding to the 'TPC Command Field=3' is −3 dB; if any code point in the information of the non-TPC command in the DCI is N, then enabling the UE to determine that the power control value corresponding to the 'TPC Command Field=3' is 3 dB;

accordingly, N is all 0 s, M is all 1 s; or, N is all 1 s, M is all 0 s.

For example, the above-mentioned one arbitrary bit may include: localized virtual resource flag (Localized VRB assignment flag), distributed virtual resource flag (Distributed VRB assignment flag), or frequency hopping flag (Frequency hopping flag) and so on, this embodiment is merely for illustration, not for limitation.

In a fourth optional implementation scenario, if the first condition is a power control value preset in the UE, and the preset power control value is 0 dB or reserved, then the enabling the UE to determine, according to the first condition, the power control value corresponding to the 'TPC Command Field=3' in the step 401 may include:

enabling the UE to determine that the power control value corresponding to the 'TPC Command Field=3' is 0 dB or reserved.

In a fifth optional implementation scenario, if the first condition is indication information that is sent by the base station and indicates the power control value, and the indication information is to indicate that the power control value is 0 dB or reserved, then the enabling the UE to determine, according to the first condition, the power control value corresponding to the 'TPC Command Field=3' in the step 401 may include:

enabling the UE to determine, according to the indication information, the power control value corresponding to the 'TPC Command Field=3'. Otherwise, the power control value is set in accordance with the specification of LTE Rel-11, i.e., 3 dB. That is to say, when the UE does not receive the above indication information, the UE determines the power control value in accordance with the specification of LTE Rel-11, i.e. 3 dB.

The method for power adjustment according to the embodiment can solve the problem in the prior art that the power of UE is unnecessarily accumulated excessively high or excessively low due to false alarms or erroneous detection of the PDCCH, thereby can reduce the power waste and reduce the interference to an uplink channel of other UE.

Specifically, in a practical application, the probability distribution of the raise and the decline may be the same, however, currently the PDCCH in the accumulated mode supports a raise by 1 dB and 3 dB, but supports a decline only by −1 dB, the raise and the decline are unequal, and thus, the UE performs blind detection 44 times in every transmission TTI, when accumulated for a relatively long time (such as 1 s, 3 s or 5 s), the power of UE will be increased unnecessarily due to false alarms or erroneous detection of the PDCCH. In this embodiment, by setting the first condition to make the raise and the decline distributed equally, thereby it will not result in the problem that the power of UE is excessively high or excessively low.

Figure 5:
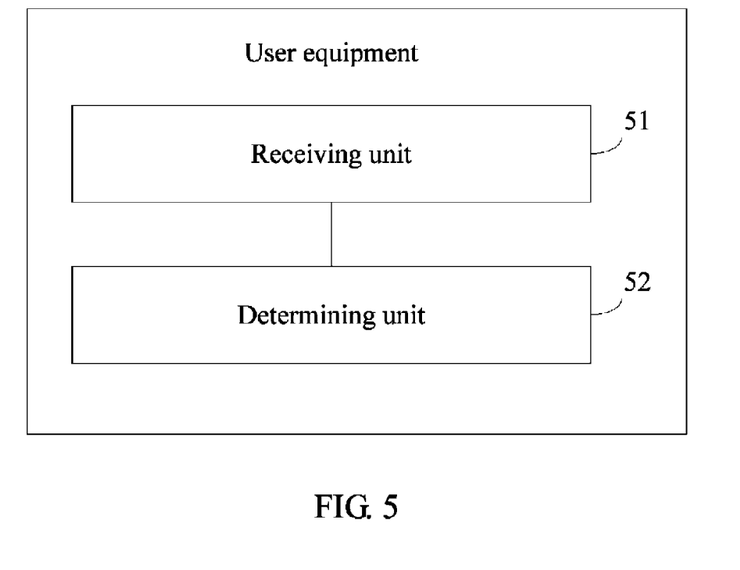
FIG. 5 is a schematic structural diagram of a user equipment provided by another embodiment of the present invention.

FIG. 5 shows a schematic structural diagram of a user equipment provided by another embodiment of the present invention, as shown in FIG. 5, the user equipment in this embodiment includes: a receiving unit 51 and a determining unit 52;

where the receiving unit 51 is configured to receive DCI that is sent by a base station and carries a TPC command; the determining unit 52 is configured to determine, according to a power control command field in the TPC command and a first condition, a power control value corresponding to the power control command field.

Optionally, the determining unit is specifically configured to, when the power control command field in the TPC command of the DCI received by the receiving unit 51 is 3 (i.e., TPC Command Field=3), determine, according to the first condition, the power control value corresponding to the power control command field.

The first condition may be any one of the following:
information of a time when the receiving unit 51 receives the DCI;
information of a position of a PDCCH candidate;
information of a non-TPC command in the DCI;
a power control value preset in the UE;
indication information that is sent by the base station and received by the receiving unit 51, and indicates the power control value.

For example, if the first condition is the information of the time when the receiving unit 51 receives the DCI, then the determining unit 52 is specifically configured as the following, when the TPC Command Field=3 in the DCI, and the information of the time of the DCI is sub-frame N, the determining unit 52 is configured to determine that the power control value corresponding to the 'TPC Command Field=3' is 3 dB; when the information of the time of the DCI is sub-frame M, the determining unit 52 is configured to determine that the power control value corresponding to the 'TPC Command Field=3' is −3 dB;

where, N is an odd number, M is an even number; or, N is an even number, M is an odd number.

In another application scenario, if the first condition is information of the position of the PDCCH candidate, then the determining unit 52 is specifically configured to, when the TPC Command Field=3 in the DCI, if the information of the position of the PDCCH candidate is $L\{(Y_k+m') \bmod \lfloor N_{CCE,k}/L \rfloor\}+i$, and the parameter m' is N, then determine that the power control value corresponding to the 'TPC Command Field=3' is 3 dB;

when the TPC Command Field=3 in the DCI, if the information of the position of the PDCCH candidate is $L\{(Y_k+m') \bmod \lfloor N_{CCE,k}/L \rfloor\}+i$, and the parameter m' is M, then UE determines that the power control value corresponding to the power control command field is −3 dB;

where, N is an odd number, M is an even number; or, N is an even number, M is an odd number;

in which, $N_{CCE,k}$ is the number of control channel elements CCEs in the sub-frame whose reference number is K; i=0, . . . , L−1, L is the number of CCEs contained in the PDCCH at a current aggregation level;

$m'=m+M^{(L)} \cdot n_{CI}$, $n_{CI}$ is a carrier indicator, m=0, . . . , $M^{(L)}-1$, $Y_k=(A \cdot Y_{k-1}) \bmod D$, $Y_{-1}=n_{RNTI} \neq 0$, A=39827, D=65537; when $n_{CI}$ exists, the value of $n_{CI}$ is an arbitrary integer of 0 to 7; when $n_{CI}$ does not exist, m'=m;

the radio network temporary identifier RNTI is an identification of the UE.

For illustrations by taking other kinds of the first condition as examples, reference may be made to the description of the above embodiments, which will not be repeated in detail herein Optionally, when the TPC command is a TPC command for a PUSCH, the receiving unit is further configured to receive a first message sent by the base station, where the first message carries indication that the power control of the PUSCH in the UE is in the accumulated mode;

Accordingly, the determining unit 52 is specifically configured to, when the power control of the PUSCH in the UE uses the accumulated mode, and the power control command field in the TPC command of the downlink control information received by the receiving unit is 3, the UE determines the power control value corresponding to the power control command field according to the first condition.

In another preferred embodiment, the above user equipment further includes an adjusting unit 53 which is not shown in the in the drawing, the adjusting unit 53 is configured to, when the TPC command is a TPC command corresponding to a PUSCH, adjust transmit power of the PUSCH according to the determined power control value;
or,
when the TPC command is a TPC command corresponding to a PUCCH, adjust transmit power of the PUCCH according to the determined power control value.

The user equipment in the embodiment can solve the problem in the prior art that false alarms or erroneous detection of PDCCH will cause the power of the UE to be unnecessarily accumulated excessively high or excessively low, thereby the power waste can be reduced, and the interference to an uplink channel of other UE can be reduced.

It should be noted that in the above user equipment embodiments, the division of the functional units is merely for illustration, and in practical implementation, the above functions may be assigned to different functional units to implement, that is, the internal structure of the user equipment may be divided into different functional units to implement all or some of the functions described above, according to actual demand, for example considering the configuration requirements of related hardware or the convenience of the software implementation. Furthermore, in the practical implementation, corresponding functional units of the embodiments may be implemented by corresponding hardware, may also be implemented by the corresponding hardware executing corresponding software, for example, the aforementioned sending unit may be hardware which has the function of executing the aforementioned sending unit, such as a transmitter, and may also be a general processor or other hardware device which can execute corresponding computer program so as to implement the aforementioned function; for another example, the aforementioned determining unit may be hardware which has the function of executing the determining unit, such as a processor, and may also be other hardware device which can execute corresponding computer program so as to implement the aforementioned function (the above principle can be applied to every embodiment provided in the present description).

In practical implementation, the user equipment may include a processor and a memory, where the processor is configured to receive downlink control information which is sent by a base station and carries a transmit power control TPC command; and configured to, when a power control command field in the TPC command of the downlink control information received by the processor is 3, determine, according to a first condition, a power control value corresponding to the power control command field;

The memory is configured to store the first condition, for example, the first condition may be: information of a time when the processor receives the downlink control information; or, information of a position of a PDCCH candidate; or, information of a non-TPC command in the downlink control information; or, a power control value preset in the user equipment; or, indication information that is sent by the base station and received by the processor and indicates the power control value.

For example, the memory is configured to store the preset power control value being 0 dB or reserved, in this circumstance, when the processor of the user equipment receives the downlink control information that is sent by the base station and carries the TPC command, and the power control command field in the TPC command is 3 (i.e., TPC Command Field=3), the UE determines, according to that the power control value stored in the memory is 0 dB or reserved, the power control value corresponding to the 'TPC Command Field=3' to be 0 dB or reserved.

As another implementation, in another aspect, an embodiment of the present invention further provides a user equipment. The user equipment includes a bus, a processor and a memory, the processor and the memory are mounted on the bus. The memory is configured to store codes of the steps performed by the user equipment in the method for power adjustment according to any one of FIG. 1 to FIG. 4. The processor is configured to read the codes stored in the memory through the bus, and perform steps of the user equipment in the method for power adjustment according to any one of FIG. 1 to FIG. 4.

The user equipment in the above embodiment can solve the problem in the prior art that the power of the user equipment is unnecessarily accumulated excessively high or excessively low due to false alarms or erroneous detection of the PDCCH, thereby can reduce the power waste and reduce the interference to an uplink channel of other UE.

Figure 6:
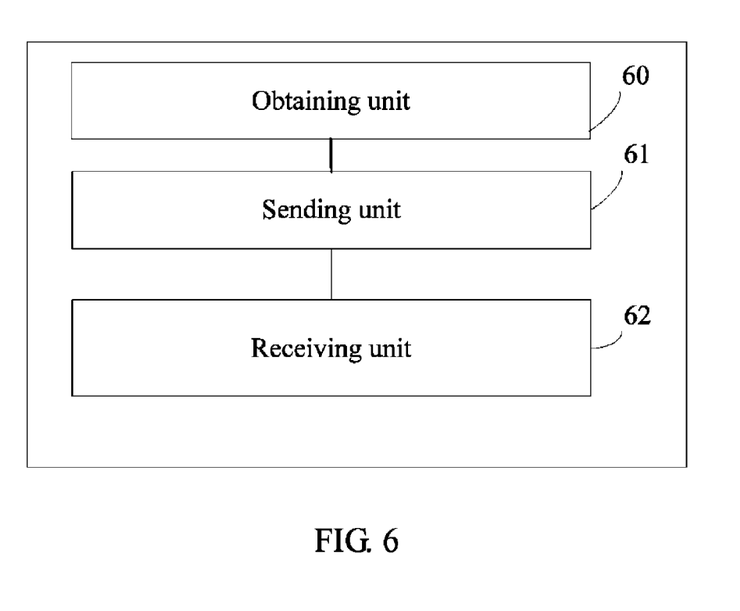
FIG. 6 is a schematic structural diagram of a base station provided by another embodiment of the present invention.

According to another aspect of the present invention, an embodiment of the present invention further provides a base station. As shown in FIG. 6, the base station includes an obtaining unit 60 and a sending unit 61. The obtaining unit 60 is configured to obtain downlink control information carrying a transmit power control TPC command; the sending unit 61 is configured to send the downlink control information to a user equipment UE, to enable the UE to determine, according to a power control command field in the TPC command and a first condition, a power control value corresponding to the power control command field.

Where the first condition is:
information of a time when the sending unit 61 sends the downlink control information;
or
information of a position of a physical downlink control channel (PDCCH) candidate carried in the downlink control information; or
information of a non-TPC command in the downlink control information; or
a power control value preset in the UE; or
indication information that is sent by the sending unit 61 and indicates the power control value.

The base station in this embodiment may further include a receiving unit 62. The receiving unit 62 is configured to, when the TPC command is a TPC command corresponding to a PUSCH, receive the PUSCH sent after the UE adjusts the transmit power of the PUSCH according to the determined power control value; or when the TPC command is a TPC command corresponding to a PUCCH, receive the PUCCH sent after the UE adjusts the transmit power of the PUCCH according to the determined power control value.

Optionally, the sending unit 61 is further configured to:
send a first message to the UE, where the first message carries indication that power control of a physical uplink shared channel PUSCH in the UE is in an accumulated mode, to enable the UE to use, according to the first message, the accumulated mode for the power control of the PUSCH in the UE, and, when the power control command field in the TPC command received by the receiving unit is 3, to determine the power control value corresponding to the power control command field according to the first condition.

Therefore, the base station in this embodiment enables the user equipment to determine the power control value corresponding to the power control command field in the TPC command according to the TPC command in the DCI sent by the sending unit and the first condition, the symmetry of the positive number (3 dB) and the negative number (−3 dB) of the power control value can be achieved; that is to say, because in the prior art the raise (1 dB, 3 dB) and the decline (−1 dB) of the power control value are unequal in the accumulated mode, whereas in this embodiment, the raise and the decline are equally distributed, thus in the case that the raise and the decline occur with the same probability, this embodiment can solve the problem that in the prior art the false alarm or erroneous detection of PDCCH will cause the power of UE to be unnecessarily accumulated excessively high or excessively low, thereby the power waste can be reduced, and the interference to an uplink channel of other UE can be reduced.

It should be noted that in the above base station embodiments, the division of the functional units is merely for illustration, in practical implementation, the above functions may be assigned to different functional units to implement, that is, the internal structure of the base station may be divided into different functional units to implement all or some of the functions described above, according to actual demand, for example considering the configuration requirements of related hardware or the convenience of software implementation. Furthermore, in practical implementation, corresponding functional units of the this embodiment may be implemented by corresponding hardware, may also be implemented by the corresponding hardware executing corresponding software, for example, the aforementioned sending unit may be hardware which has the function of executing the aforementioned sending unit, such as a transmitter, and may also be a general processor or other hardware device which can perform corresponding computer program so as to implement the aforementioned function; for another example, the aforementioned receiving unit may be hardware which has the function of executing the receiving unit, such as a receiver, and may also be a general processor or other hardware device which can execute corresponding computer program so as to implement the aforementioned function (the above principle can be applied to every embodiment provided in the present description).

In practical implementation, the base station may include a processor and a memory, where the processor is configured to send a user equipment UE downlink control information which is used to control transmit power of an uplink channel of the UE, if a power control command field in a transmit power control TPC command carried in the downlink control information is 3, then the UE is enabled to determine the power control value corresponding to the power control command field according to a first condition;

where the first condition is: information of a time when the processor sends the downlink control information; or information of a position of a physical downlink control channel (PDCCH) candidate carried in the downlink control information; or information of a non-TPC command in the downlink control information; or a power control value preset in the UE; or indication information that is sent by the processor and indicates the power control value.

In addition, the memory is configured to store information to be sent by the processor to the UE, such as the downlink control information used to control the transmit power of the uplink channel of the UE, or, the indication information used to indicate the power control value, and so on.

As another implementation form, in another aspect, an embodiment of the present invention further provides a base station. The base station includes a bus, a processor and a memory, the processor and the memory are mounted on the bus. The memory is configured to store codes of the steps performed by the base station in the method for power adjustment according to any one of FIG. 1 to FIG. 4. The processor is configured to read the codes stored in the memory through the bus, and perform steps of the base station in the method for power adjustment according to any one of FIG. 1 to FIG. 4.

The base station in this embodiment enables the user equipment to solve the problem that in the prior art the power of the user equipment is unnecessarily accumulated excessively high or excessively low due to false alarms or erroneous detection of the PDCCH, thereby can reduce the power waste and reduce the interference to an uplink channel of other UE.

According to another aspect of the present invention, the present invention further provides a communication system, the communication system includes a user equipment of any one of the above embodiments, and a base station of any one of the above embodiments, and the user equipment communicates with the base station.

Persons of ordinary skill in the art may understand that all or a part of the steps of the method embodiments may be implemented by a program instructing relevant hardware. The program may be stored in a computer readable storage medium. When the program is executed, the steps of the method embodiments are performed. The storage medium may be any medium that is capable of storing program codes, such as a ROM, a RAM, a magnetic disk, or an optical disk etc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent substitutions to some or all technical features thereof; however, these modifications or substitutions do not make the nature of corresponding technical solutions depart from the scope of the technical solutions in the embodiments of the present invention.

What is claimed is:

1. A method for power adjustment, comprising:

receiving, by a user equipment (UE), downlink control information that is sent by a base station and carries a transmit power control (TPC) command;

determining, by the UE, according to a power control command field in the TPC command and a first condition, a power control value corresponding to the power control command field;

wherein the first condition comprises:

information of a time when the UE receives the downlink control information; or information of a position of a physical downlink control channel (PDCCH) candidate; or information of a non-TPC command in the downlink control information; or a power control value preset in the UE; or indication information that is sent by the base station and used to indicate the power control value; and wherein when the first condition comprises the information of the position of the PDCCH candidate, the determining, by the UE, according to the first condition, the power control value corresponding to the power control command field, comprises:

if the information of the position of the PDCCH candidate is $L\{(Y_k+m') \bmod \lfloor N_{CCE,k}/L \rfloor\}+i$, and the parameter m' is N, then determining, by the UE, that the power control value corresponding to the power control command field is 3 dB;

if the information of the position of the PDCCH candidate is $L\{(Y_k+m') \bmod \lfloor N_{CCE,k}/L \rfloor\}+i$, and the parameter m' is M, then determining, by the UE, that the power control value corresponding to the power control command field is −3 dB;

wherein N is an odd number, M is an even number; or, N is an even number, M is an odd number;

wherein, $N_{CCE,k}$ is a number of control channel elements (CCEs) in a sub-frame whose reference number is K;

i=0, . . . , L−1, L is a number of CCEs contained in a PDCCH at a current aggregation level;

$m'=m+M^{(L)} \cdot n_{CI}$, $n_{CI}$ is a carrier indicator, m=0, . . . , $M^{(L)}-1$, $Y_k=(A \cdot Y_{k-1}) \bmod D$, $Y_{-1}=n_{RNTI} \neq 0$, A=39827, D=65537; when $n_{CI}$ exists, the value of $n_{CI}$ is an arbitrary integer of 0 to 7; when $n_{CI}$ does not exist, m'=m;

the radio network temporary identifier (RNTI) is an identification of the UE.

2. The method according to claim 1, wherein the determining, by the UE, according to the power control command field in the TPC command and the first condition, the power control value corresponding to the power control command field, comprises:

when the power control command field in the TPC command is 3, determining, by the UE, according to the first condition, the power control value corresponding to the power control command field.

3. The method according to claim 2, wherein before the receiving, by the UE, the downlink control information that is sent by the base station and carries the TPC command, the method further comprises:

receiving, by the UE, a first message sent by the base station, wherein the first message is used to indicate that an accumulated mode is used for power control of a physical uplink shared channel (PUSCH) in the UE;
when the power control command field in the TPC command is 3, the determining, by the UE, according to the first condition, the power control value corresponding to the power control command field, comprises:
when the accumulated mode is used for the power control of the PUSCH in the UE, and when the power control command field in the TPC command is 3, determining, by the UE, according to the first condition, the power control value corresponding to the power control command field.

4. The method according to claim 1, wherein when the first condition comprises the information of the time when the UE receives the downlink control information, the determining, by the UE, according to the first condition, the power control value corresponding to the power control command field, comprises:
when the information of the time when the UE receives the downlink control information is sub-frame N, then determining, by the UE, that the power control value corresponding to the power control command field is 3 dB;
when the information of the time when the UE receives the downlink control information is sub-frame M, then determining, by the UE, that the power control value corresponding to the power control command field is −3 dB;
wherein N is an odd number, M is an even number; or, N is an even number, M is an odd number.

5. The method according to claim 1, wherein when the first condition comprises the information of the non-TPC command in the downlink control information, the determining, by the UE, according to the first condition, the power control value corresponding to the power control command field, comprises:
if one arbitrary bit in the information of the non-TPC command in the downlink control information is N, then determining, by the UE, that the power control value corresponding to the power control command field is 3 dB;
if one arbitrary bit in information of the non-TPC command in the downlink control information is M, then determining, by the UE, that the power control value corresponding to the power control command field is −3 dB;
wherein N equals 0, M equals 1; or, N equals 1, M equals 0.

6. The method according to claim 5, wherein the one arbitrary bit is used to indicate a localized virtual resource flag, a distributed virtual resource flag, or a frequency hopping flag.

7. The method according to claim 1, wherein the preset power control value is 0 dB or reserved.

8. The method according to claim 1, wherein the indication information that is sent by the base station and used to indicate that the power control value is 0 dB or reserved, and the UE determines, according to the indication information, that the power control value corresponding to the power control command field is 0 dB or reserved.

9. The method according to claim 1, further comprising:
when the TPC command is a TPC command corresponding to a PUSCH, adjusting, by the UE, according to the determined power control value, transmit power of the PUSCH;
or,
when the TPC command is a TPC command corresponding to a PUCCH, adjusting, by the UE, according to the determined power control value, transmit power of the PUCCH.

10. A user equipment, comprising:
a receiver, configured to receive downlink control information that is sent by a base station and carries a transmit power control (TPC) command;
a processor, configured to determine, according to a power control command field in the TPC command and a first condition, a power control value corresponding to the power control command field;
wherein the first condition comprises:
information of a time when the UE receives the downlink control information; or
information of a position of a physical downlink control channel (PDCCH) candidate; or
information of a non-TPC command in the downlink control information; or
a power control value preset in the UE; or
indication information that is sent by the base station and indicates the power control value; and
wherein the first condition comprises the information of the position of the PDCCH candidate;
wherein the processor determining the power control value corresponding to the power control command field according to the power control command field in the TPC command and the first condition is configured to:
if the information of the position of the PDCCH candidate is $L \{(Y_k+m') \mod \lfloor N_{CCE,k}/L \rfloor\}+i$, and the parameter m' is N, determine that the power control value corresponding to the power control command field is 3 dB;
if the information of the position of the PDCCH candidate is $L \{(Y_k+m') \mod \lfloor N_{CCE,k}/L \rfloor\}+i$, and the parameter m' is M, determine that the power control value corresponding to the power control command field is −3 dB;
wherein N is an odd number, M is an even number; or, N is an even number, M is an odd number;
wherein,
$N_{CCE,k}$ is a number of control channel elements (CCEs) in a sub-frame whose reference number is K;
i=0, . . . , L−1, L is a number of CCEs contained in a PDCCH at a current aggregation level:
$m'=m+M^{(L)} \cdot n_{CI}$, $n_{CI}$ is a carrier indicator, m=0, . . . , $M^{(L)}-1$, $Y_k=(A \cdot Y_{k-1}) \mod D$, $Y_{-1}=n_{RNTI} \neq 0$, A=39827, D=65537; when $n_{CI}$ exists, the value of $n_{CI}$ is an arbitrary integer of 0 to 7; when $n_{CI}$ does not exist, m'=m;
the radio network temporary identifier (RNTI) is an identification of the UE.

11. The user equipment according to claim 10,
wherein the processor determining the power control value corresponding to the power control command field according to the power control command field in the TPC command and the first condition is configured to, when the power control command field in the TPC command of the downlink control information received by the receiver is 3, determine, according to the first condition, the power control value corresponding to the power control command field.

12. The user equipment according to claim 11,
wherein the receiver is further configured to receive a first message sent by the base station, wherein the first message is used to indicate that an accumulated mode is used for power control of a physical uplink shared channel (PUSCH) in the UE;

wherein the processor determining the power control value corresponding to the power control command field when the power control command field in the TPC command of the downlink control information received by the receiver is configured to use the accumulated mode for the power control of the PUSCH in the UE, and, when the power control command field in the TPC command of the downlink control information received by the receiver is, determines, according to the first condition, the power control value corresponding to the power control command field.

13. The method according to claim 10,
wherein the first condition comprises the information of the time when the UE receives the downlink control information;
wherein the processor determining the power control value corresponding to the power control command field according to the power control command field in the TPC command and the first condition, is configured to:
when the information of the time when the UE receives the downlink control information is sub-frame N, determine that the power control value corresponding to the power control command field is 3 dB;
when the information of the time when the UE receives the downlink control information is sub-frame M, determine that the power control value corresponding to the power control command field is −3 dB;
wherein N is an odd number, M is an even number; or, N is an even number, M is an odd number.

14. The method according to claim 10,
wherein the first condition comprises the information of the non-TPC command in the downlink control information;
wherein the processor determining the power control value corresponding to the power control command field according to the power control command field in the TPC command and the first condition is configured to:
if one arbitrary bit in the information of the non-TPC command in the downlink control information is N, determine that the power control value corresponding to the power control command field is 3 dB;
if one arbitrary bit in information of the non-TPC command in the downlink control information is M, determine that the power control value corresponding to the power control command field is −3 dB;
wherein N equals 0, M equals 1; or, N equals 1, M equals 0.

15. The method according to claim 14, wherein the one arbitrary bit is used to indicate a localized virtual resource flag, a distributed virtual resource flag, or a frequency hopping flag.

16. The user equipment according to claim 10,
the processor is further configured to adjust, according to the determined power control value, transmit power of the PUSCH when the TPC command is a TPC command corresponding to a PUSCH;
or,
the processor is further configured to adjust, according to the determined power control value, transmit power of the PUCCH when the TPC command is a TPC command corresponding to a PUCCH.

17. A base station, comprising:
an processor, configured to obtain downlink control information carrying a transmit power control (TPC) command;
a transmitter, configured to send the downlink control information to a user equipment UE, to enable the UE to determine, according to a power control command field in the TPC command and a first condition, a power control value corresponding to the power control command field;
wherein the first condition comprises:
information of a time when the base station sends the downlink control information;
information of a position of a physical downlink control channel (PDCCH) candidate carried in the downlink control information;
information of a non-TPC command in the downlink control information;
a power control value preset in the UE; or
indication information that is sent by the base station and indicates the power control value; and
wherein the first condition comprises the information of the position of the PDCCH candidate, the determining, by the UE, according to the first condition, the power control value corresponding to the power control command field, comprises:
if the information of the position of the PDCCH candidate is $L\{(Y_k+m') \bmod \lfloor N_{CCE,k}/L \rfloor\}+i$, and the parameter m' is N, then determining, by the UE, that the power control value corresponding to the power control command field is 3 dB;
if the information of the position of the PDCCH candidate is $L\{(Y_k+m') \bmod \lfloor N_{CCE,k}/L \rfloor\}+i$, and the parameter m' is M, then determining, by the UE, that the power control value corresponding to the power control command field is −3 dB;
wherein N is an odd number, M is an even number; or, N is an even number, M is an odd number;
wherein,
$N_{CCE,k}$ is a number of control channel elements (CCEs) in a sub-frame whose reference number is K;
i=0, . . . , L−1, L is a number of CCEs contained in a PDCCH at a current aggregation level;
$m'=m+M^{(L)} \cdot n_{CI}$, $n_{CI}$ is a carrier indicator, m=0, . . . , $M^{(L)}$−1, $Y_k=(A \cdot Y_{k-1})\bmod D$, $Y_{-1}=n_{RNTI} \neq 0$, A=39827, D=65537; when $n_{CI}$ exists, the value of $n_{CI}$ is an arbitrary integer of 0 to 7; when $n_{CI}$ does not exist, m'=m;
the radio network temporary identifier (RNTI) is an identification of the UE.

18. The base station according to claim 17, wherein the transmitter is further configured to:
send a first message to the UE, wherein the first message is used to indicate that an accumulated mode is used for power control of a physical uplink shared channel (PUSCH) in the UE, to enable the UE to use, according to the first message, the accumulated mode for the power control of the PUSCH in the UE, and, when the power control command field in the TPC command received by the UE is 3, determine, according to the first condition, the power control value corresponding to the power control command field.

* * * * *